July 22, 1969 D. EVANS ET AL 3,456,949

GAME DEVICE FOR USE WITH A PHONOGRAPH

Filed Dec. 6, 1966

INVENTORS.
DON EVANS
RAY STONE
WILLIAM FORMAN
BY ALLEN M. TABER.
Robert K. Youtie
ATTORNEY.

United States Patent Office 3,456,949

Patented July 22, 1969

3,456,949

GAME DEVICE FOR USE WITH A PHONOGRAPH

Don Evans, 6519 Ventnor Ave, Atlantic City, N.J. 08406; Ray Stone, Steel Pier, Atlantic City, N.J.; William Forman, 1337 E. Sedgwick St., Philadelphia, Pa. 19150; and Allen M. Taber, 7904 Monmouth Ave., Margate, N.J. 08402

Filed Dec. 6, 1966, Ser. No. 599,447

Int. Cl. A63b *71/00;* A63f *1/18*

U.S. Cl. 273—142 2 Claims

ABSTRACT OF THE DISCLOSURE

A plate having marked spaces for positioning on a phonograph turntable to rotate therewith, resilient pins upstanding in an annular array from the plate, and an indicator removably carried by the phonograph tone arm for resilient slapping engagement with the pins to indicate an inter-pin space.

This invention relates generally to games, and is especially concerned with a unique construction of game device for use with a phonograph or record player.

The essentials of the instant invention include a game plate or disc superposable upon the turntable of a record player for rotation therewith and having a circular array of markings defining game-play spaces. Cooperative therewith is an indicator or pointer mountable upon the tone arm of a record player for the chance indication of a playing space of the disc upon cessation of disc rotation.

It is an important object of the present invention to provide a game device of the type described which is extremely simple in construction, capable of use with a wide variety of types and styles of phonographs or record players, and which is adapted for the play of a number of different games.

It is a more particular object of the present invention to provide a game device for use with a record player wherein a game plate or disc is seated upon and rotated with the record-player turntable, while a pointer is mounted on the record-player tone arm for the chance indication of a particular circumferential location of the disc.

The instant invention further contemplates, in one embodiment thereof, the provision of an annular array of pins upstanding from a disc for rotation with a record-player turntable, and a resiliently deflectable pointer mountable on a record-player tone arm for slapping engagement with and bending by successive pins upon turntable rotation.

The instant invention further contemplates the provision of a game device having the advantageous characteristics mentioned in the preceding paragraph which is admirably well suited for use in the play of a variety of games, in accordance with the markings of the rotatable disc and rules employed.

Other objects of the present invention will become apparent upon reading the following specification and referring to the accompanying drawings, which form a material part of this disclosure.

The invention accordingly consists in the features of construction, combinations of elements, and arrangements, of parts, which will be exemplified in the construction hereinafter described, and of which the scope will be indicated by the appended claims.

Figure 1:
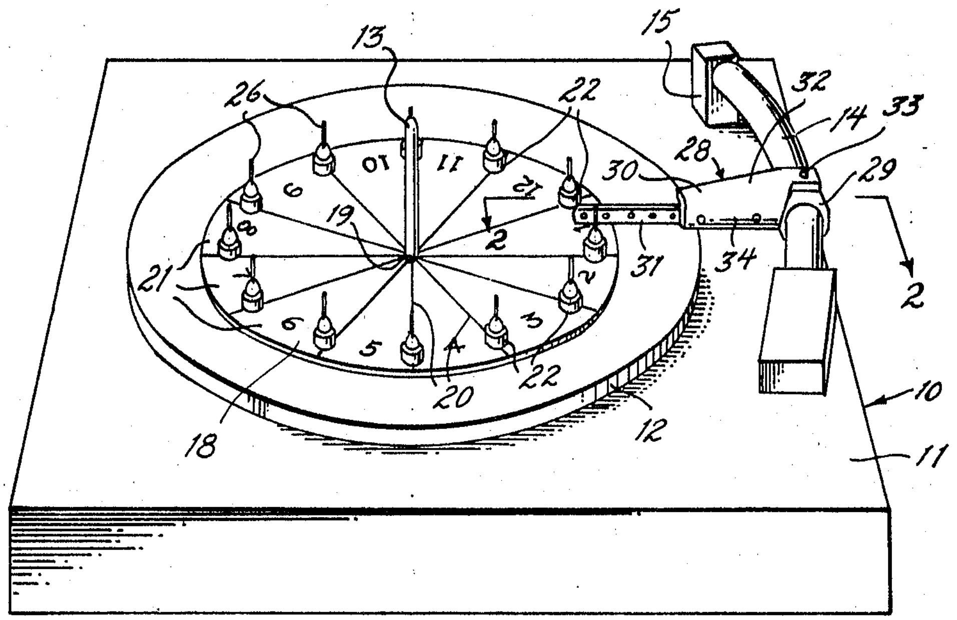
FIGURE 1 is a top perspective view illustrating a game device of the present invention in operative association with a phonograph.

Referring now more particularly to the drawings, and specifically to FIGURE 1 thereof, a conventional phonograph or record player is there generally designated 10, and may include a generally boxlike enclosure or housing 11 containing the usual control and drive mechanisms. Disposed horizontally over the housing 11 is a generally circular turntable 12 mounted in any suitable manner for axial rotation about a generally vertical axis. A central post 13 may upstand from the turntable 12, concentric therewith.

An elongate tone arm 14 is located outward and along one side of the turntable 12, being mounted at one end, as by suitable mounting means 15 for swinging movement about a generally vertical axis and provided with suitable means (not shown) for retention in its illustrated position outward of the turntable.

The game device includes a generally flat circular plate or disc 18, which may have a central thru opening or hole 19. The disc 18 may be of a diameter less than that of the turntable 12, and the central hole 19 may be adequate to receive the post 13. Of course, different sizes of discs 18 and central holes 19 may be provided for different sizes of turntables 12 and posts 13, say for 45 r.p.m. record players, or other special phonographs.

The disc 18 may advantageously be fabricated of plastic, such as polyethylene, having an inherent stiffness to rest flat on the turntable, but yieldable to resist breakage.

The upper surface of the disc 18 is provided with suitable markings, as by the equiangularly spaced radial lines 20 subdividing the upper disc face into a circular array of sector-shaped spaces 21. The sector-shaped spaces 21 may be numerically marked, as indicated, or otherwise.

In addition, a plurality of pins 22 may be fixed to the disc 18, upstanding from the upper surface thereof and arranged in a circular array extending along the circumference of the disc. As in the illustrated embodiment, the pins 22 are advantageously each located at the outer end of a respective radial marking line 20 and combine therewith to subdivide the upper disc face into the spaces 21.

Figure 2:
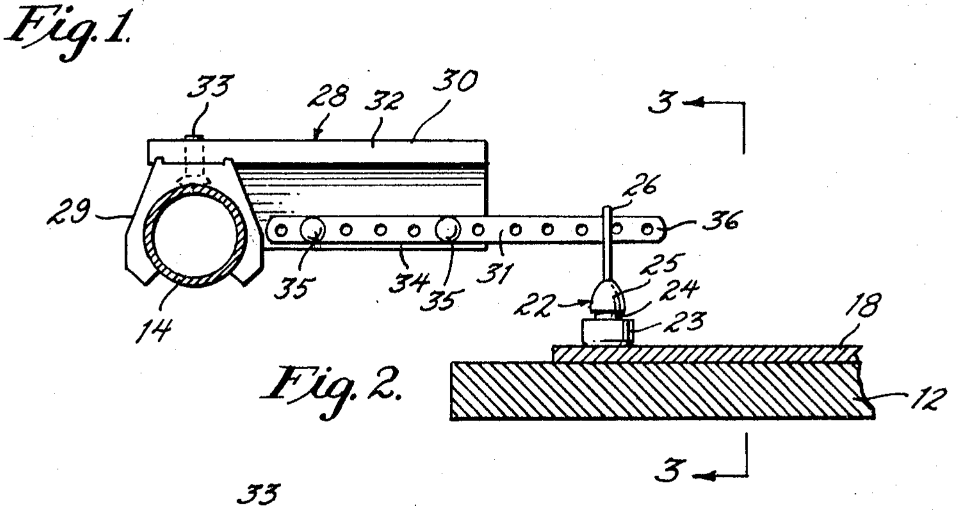
FIGURE 2 is a partial sectional elevational view taken generally along the line 2—2 of FIGURE 1.
Figure 3:
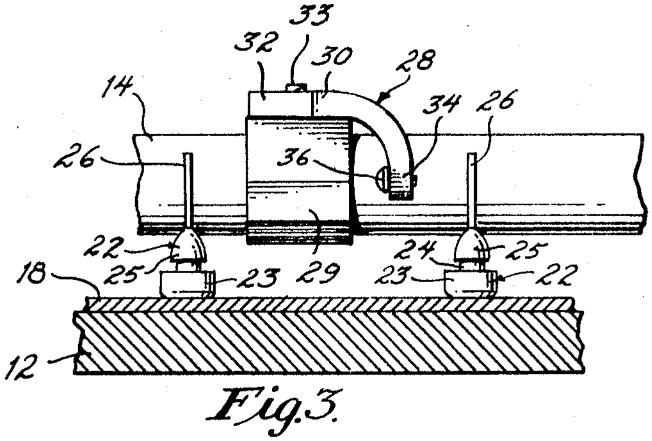
FIGURE 3 is a partial sectional elevational view taken generally along the line 3—3 of FIGURE 2.

The structure of the pins 22 is best seen in FIGURES 2 and 3, and may include a generally cylindrical, relatively large base 23 integral with or fixedly secured to and projecting from the upper surface of the disc. A reduced portion or neck 24 extends upward from the upper end of each pin base 23, and an upwardly tapering portion 25 extends upward from the reduced neck 24. A relatively slender, elongate stem 26 projects upwardly from the upper, smaller end of the tapering portion 25. In practice, the pins 22 may each be formed integrally, preferably of a yieldably resilient material, such as polyethylene, rubber, or other. Of course, the base 23 of each pin may be suitably fixed to the disc 18, as by any desired fastener means, or otherwise.

In addition, the game device of the instant invention includes an indicator, generally designated 28, which is removably carried by the tone arm 14. The indicator 28 may be constructed to include at one end an attachment part 29 for firm, detachable connection to the tone arm 14. Extending from the attachment part 29 may be an extension 30, generally toward and terminating short of the disc 18. A pointer 31 is carried by the extension 30 and extends beyond the end of the latter over the peripheral margin of the disc 18 to intersect with the circular path of movement of the pins 22.

More specifically, the indicator attachment part 29 may be constructed in the form of a resilient, generally U-shaped clip arranged in inverted relation and snap-engaged over the top of tone arm 14. The attachment member or clip 29 may be of any suitable resilient construction, as desired.

The extension 30 may include an elongate, relatively straight upper portion 32 fixed by any suitable means, say a fastener 33, to the upper side or bight portion of clip 29 and extending generally horizontally therefrom radially inward with respect to the turntable 12. The elongate member 32 terminates short of the disc 18, and includes a longitudinally extending side portion 34 depending from one side of the elongate member. The depending portion 34 may terminate at its radially inner end coterminous with the elongate member 32. In practice, the elongate member 32 and depending portion 34 of the extension 30 may be integrally formed of relatively stiff plastic, or other suitable material.

The pointer 31 may comprise an elongate strip of resiliently deflectable material, such as flexible plastic, extending longitudinally along the depending extension portion 34 and fixed thereto by any suitable means, such as fasteners 35. Further, the strip or pointer 31 extends beyond the extension 30 radially inward with respect to the turntable 12 and terminates in a free end portion 36 spaced over the peripheral margin of the plate 18. The radially inward, free end portion 36 of pointer 31 is located at an elevation adjacent to and spaced below the upper ends of the pins 22, and extends across or intersects the circular path of movement of the pins.

Thus, upon rotation of turntable 12, and consequent rotation with the turntable of the disc 18 and its pins 22, the pointer or resilient strip 31 is successively engaged by adjacent pins 22. By its resilient flexibility, the pointer or strip 31 is deflected or bent by the pins 22, riding over successive pins upon rotation thereof and swinging, by its internal restoring force, into slapping engagement with the next adjacent pin. Upon cessation of turntable rotation, the pointer 31 will be located between a pair of adjacent pins 22 directly over and in indicating relation with respect to a game space 21 of the disc.

The action of pointer 31 with the pins 22 combine to provide an attractive sound effect; and, the yieldable resilience of the pins further reinforces the above-described cooperation with the pointer 31, as well as affording safety to the users. If desired, the pointer 31 may be adjustably secured to the extension 30, as for selective determination of the radial inward extent of the pointer.

As noted hereinbefore, the central hole 19 of the disc 18 may be of greater size, say to accommodate the post of a 45 r.p.m. record player. In such case the disc 18 may be provided with suitable adaptor means for use on a post, as illustrated, or the underside of the disc may be provided with a frictional surface for nonslip engagement with the upper surface of the turntable 12.

In play of the game, the markings of disc 18 may be varied widely to be suitable for various games, such as roulette, any of the well-known spinner-type games, etc. Also, an automatic timer may be employed to operate the turntable and deenergize the same independent of manual operation.

From the foregoing, it is seen that the present invention provides a game device for use with a phonograph or record player, which device fully accomplishes its intended objects and is well adapted to meet practical conditions of manufacture, distribution and use.

Although the present invention has been described in some detail by way of illustration and example for purposes of clarity of understanding, it is understood that certain changes and modifications may be made within the spirit of the invention and scope of the appended claims.

What is claimed is:

1. A game device for use with a phonograph having a rotary turntable and a tone arm adjacent to the turntable, said device comprising a generally flat disc having a central opening and removably positionable on said turntable for rotation therewith, said disc being marked to provide a circumferential array of game spaces, a plurality of resiliently deflectable pins upstanding from said disc in a generally circular array each intermediate an adjacent pair of game spaces, resilient clip means adapted to be removably snap-engaged over the top of said tone arm and having a relatively rigid elongate member adapted to extend from the upper side of said clip toward and above said turntable, a longitudinally extending depending portion on one side of said elongate member, and a resilient pointer strip secured longitudinally along said depending portion and having a free end extending beyond said depending portion and positionable over said plate into the path of movement of said pins.

2. A game device according to claim 1, said pins each being fabricated of resiliently yieldable material and comprising a base secured on the uper face of said disc, an upwardly tapering portion upstanding from said base, and a reduced stem projecting upwardly from said tapering portion.

References Cited

UNITED STATES PATENTS

| | | | |
|---|---|---|---|
| 1,248,064 | 11/1917 | Blackman | 274—47 |
| 1,424,023 | 7/1922 | Landgraf et al | 274—47 |
| 1,431,170 | 10/1922 | Maier. | |
| 1,437,472 | 12/1922 | Maier. | |

FOREIGN PATENTS

| | | |
|---|---|---|
| 703,661 | 2/1931 | France. |
| 312,493 | 5/1929 | Great Britain. |

ANTON O. OECHSLE, Primary Examiner

A. W. KRAMER, Assistant Examiner